United States Patent

Bentzman

[15] 3,656,848
[45] Apr. 18, 1972

[54] NON-ALIGNED IMAGE OPTICAL SYSTEM FOR AN ELECTROSTATIC COPY MACHINE

[72] Inventor: Louis Bentzman, Levittown, Pa.
[73] Assignee: Electrocopy Corporation, Philadelphia, Pa.
[22] Filed: Mar. 13, 1970
[21] Appl. No.: 19,273

[52] U.S. Cl. .................................355/8, 355/65, 355/3
[51] Int. Cl. ..........................................G03g 15/04
[58] Field of Search ........................355/3, 8, 65, 66

[56] References Cited

UNITED STATES PATENTS

| | | | |
|---|---|---|---|
| 3,437,410 | 4/1969 | Tregay et al. | 355/66 X |
| 2,807,190 | 9/1957 | Oldenboom | 355/8 |
| 3,508,825 | 4/1970 | Hyosaka | 355/65 X |

OTHER PUBLICATIONS

IBM Technical Disclosure Bulletin, Vol. 9, No. 11, April 1967, "Electrophotographic Copier" by H. C. Medley at p. 1522

*Primary Examiner*—John M. Moran
*Assistant Examiner*—Thomas A. Mauro
*Attorney*—Karl L. Spivak

[57] ABSTRACT

A non-aligned image in an optical system for use in an electrostatic copy machine including an upper mirror angularly disposed from the horizontal orientation of the machine and a lower mirror angularly disposed from the horizontal orientation of the machine and a combination lens and mirror positioned in the light path between the upper mirror and the lower mirror, the said upper and lower mirrors and the combination lens and mirror being centered in an optical axis in which the image is transversely offset from the central axis of the optical system and the copy machine.

4 Claims, 4 Drawing Figures

INVENTOR.
LOUIS BENTZMAN

BY Karl L. Spivak

ATTORNEY.

INVENTOR.
LOUIS BENTZMAN

BY Karl L Spivak

ATTORNEY.

NON-ALIGNED IMAGE OPTICAL SYSTEM FOR AN ELECTROSTATIC COPY MACHINE

BACKGROUND OF THE INVENTION

This invention relates in general to the art of electrostatic copying, and more particularly, is directed to a novel mirror and lens system having the image axis off-center from the central axis of the optical system and machine itself.

The present invention is concerned with an office type of electrostatic copy machine, using a optical system which includes a lens preferably of the book copier type. In prior art models, one of the major difficulties encountered in using a book copier was the necessity of placing the original sheet to be copied in the center of the scanning table in order to optically center the image produced upon the copy. In the case of relatively large books, this procedure usually resulted in the breaking of the binding of the book in an effort to place the page being copied in the table center, thereby rendering the book copy machine relatively unsuitable for the designed purpose. Additionally, prior art book copiers suffered from loss of image character close to the margins whereby the curvature of the paper into the binding took the page being copied out of focus of the optical system. In the past, it has been the normal procedure in designing a lens system to position all equipment exactly centered upon the optical axis. The alignment of the optical axis and the machine axis necessitated placing the book medially upon the glass scanning table surface with the resultant inability of keeping the sheets being copied flat against the table surface.

In prior art models presently available, the original sheet is positioned upon the scanning table where direct light from the machine photo lamp may be reflected by the optical system onto a sheet of copy paper upon which an electrostatic charge has been impressed by an electrostatic charger. An image of the written material to be copied is then projected onto the previously charged surface of the copy sheet in varying intensities corresponding with the light and dark shades present in the original. The exposed charged copy paper then feeds through a toner bath wherein toner particles are attracted to the charged sheet in proportion to the intensity of the charge corresponding to the impressed image to thus form a visible image thereon. The copy paper is then passed through a dryer assembly to both affix the toner to the paper and to completely dry the paper prior to delivery. Inasmuch as the copy produced bears a quality in direct proportion to the quality of the image impressed upon the charged paper, any interference with producing a true quality electrostatic image, such as may be encountered by the binding of a book forcing the sheet out of focus of the optical system, directly affects the quality of the final copy.

SUMMARY OF THE INVENTION

The present invention overcomes the difficulties encountered by prior workers in the field by placing the object off-center of the optical axis. In this manner, the image follows the optical path through the machine and comes out off-center of the optical axis below. By so doing, it has been found that a book may be placed with the sheet being copied flat against the work surface with the binding positioned at the edge of the machine. In this manner, it is possible to work directly to the edge of a binding or to the edge of an object area. The copy sheet is suitably placed off the optical axis in position to receive the reflected image in a manner effectively centering the copy on the copy paper as if everything was in fact aligned with the optical axis.

It is therefore an object of the present invention to provide an improved copy machine optical system of the type set forth.

It is another object of the present invention to provide a novel non-aligned image system wherein the image axis is off-set from the optical axis and the center of machine axis.

It is another object of the present invention to provide a novel non-aligned image system employing a pair of vertically separated mirrors reflecting through a lens system.

It is another object of the present invention to provide a non-aligned image system for use with a book copier which permits photocopying into the binding area of the book subject matter.

It is another object of the present invention to provide a novel non-aligned image system that is simple in construction, correct in operation and trouble-free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

DESCRIPTION OF THE PREFERRED EMBODIMENT OF THE INVENTION

Figure 1:
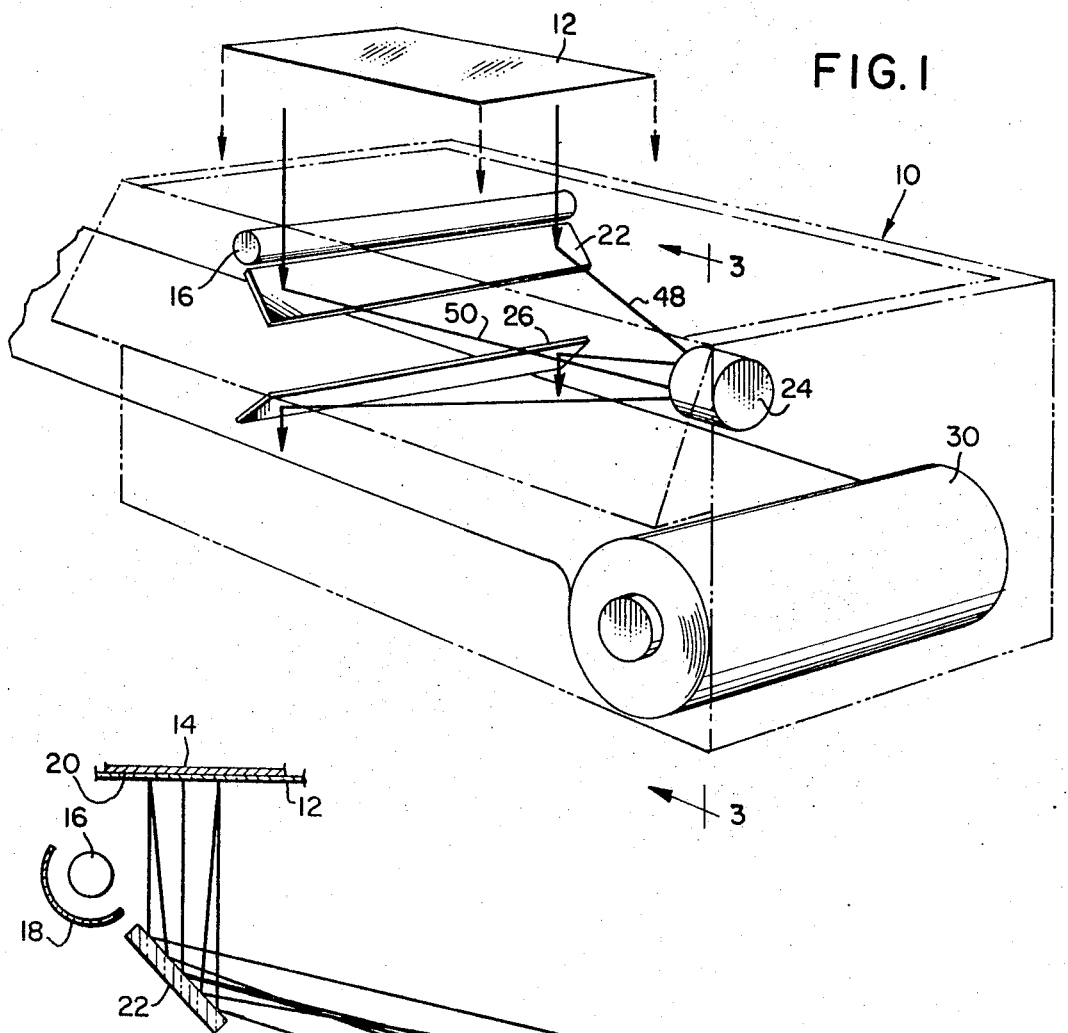
FIG. 1 is a perspective view of the invention with a copy machine shown in broken lines to illustrate the relative position of the optical system components.

Although specific terms are used in the following description for the sake of clarity, these terms are intended to refer only to the particular structure of my invention, selected for illustration in the drawings and are not intended to define or limit the scope of the invention.

Figure 2:
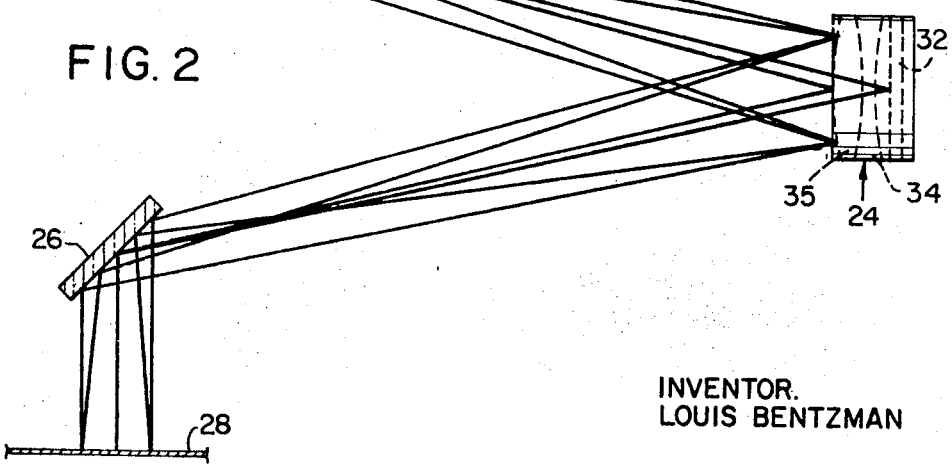
FIG. 2 is a schematic, side elevational view of the lens and mirror orientation.

Referring now to the drawings, I show in FIGS. 1 and 2 a photocopy machine 10 of the electrostatic copier type, having an upper scanning table 12 of glass or other transparent material whereon an image bearing sheet 14 is directly placed with the image carrying side directed downwardly against the scanning table surface. As illustrated, light from the light source in the nature of an elongated photocopy lamp 16 is directed by the reflector 18 through the scanning transparent table 12 to impinge upon the image bearing surface 20 of the sheet 14. The illuminated image surface 20 reflects upon the upper mirror 22 which is angularly, disposed within the photocopy machine 10 and the reflected light rays are directed to the lens system 24 which positions at the rear of the machine. The lens system 24 receives and directs the light rays from the image surface 20 to the lower mirror 26 which serves to further reflect the light rays downwardly to impinge upon a previously charged sheet 28 of electrostatic copy paper. As illustrated, the copy paper 28 feeds forwardly through the photocopy machine 10 from the paper roll 30 in well-known manner and is cut to size by other machine components, (not shown) also in well-known manner.

It will be noted that the combination of the upper mirror 22, the lower mirror 26, and the lens system 24 serve to substantially reduce the overall size of the copy machine by effectively folding the light path required by the focal length of the lens system in order to cover the image area of the original sheets of paper or books. The lens system 24 is a combination lens and mirror system of the symmetric type which is preferably corrected for chromatic aberrations. The lens 24 includes a top surface mirror 32 acting in conjunction with a concave lens 34 and its associated convex lens 35. In order to utilize the present arrangement of mirrors and lens system to its best advantage to maintain the size of the copy machine 10 to a minimum, the mirrors 22, 26 position at an angular relation from the horizontal of 45°. The 45° angular disposition further serves to assure accurate reproduction upon the copy sheet 28 as it passes directly beneath the image bearing sheet 14. Further, as best illustrated in Fig. 2, it will be observed that the image sheet 14, the upper mirror 22, the lower mirror 26 and the copy sheet 28, vertically align during the copying process. The angular disposition of the mirrors and the vertical alignment of the mirrors 22, 26 at the papers 14, 28 all serve to reduce the required machine size to a minimum.

Figure 3:
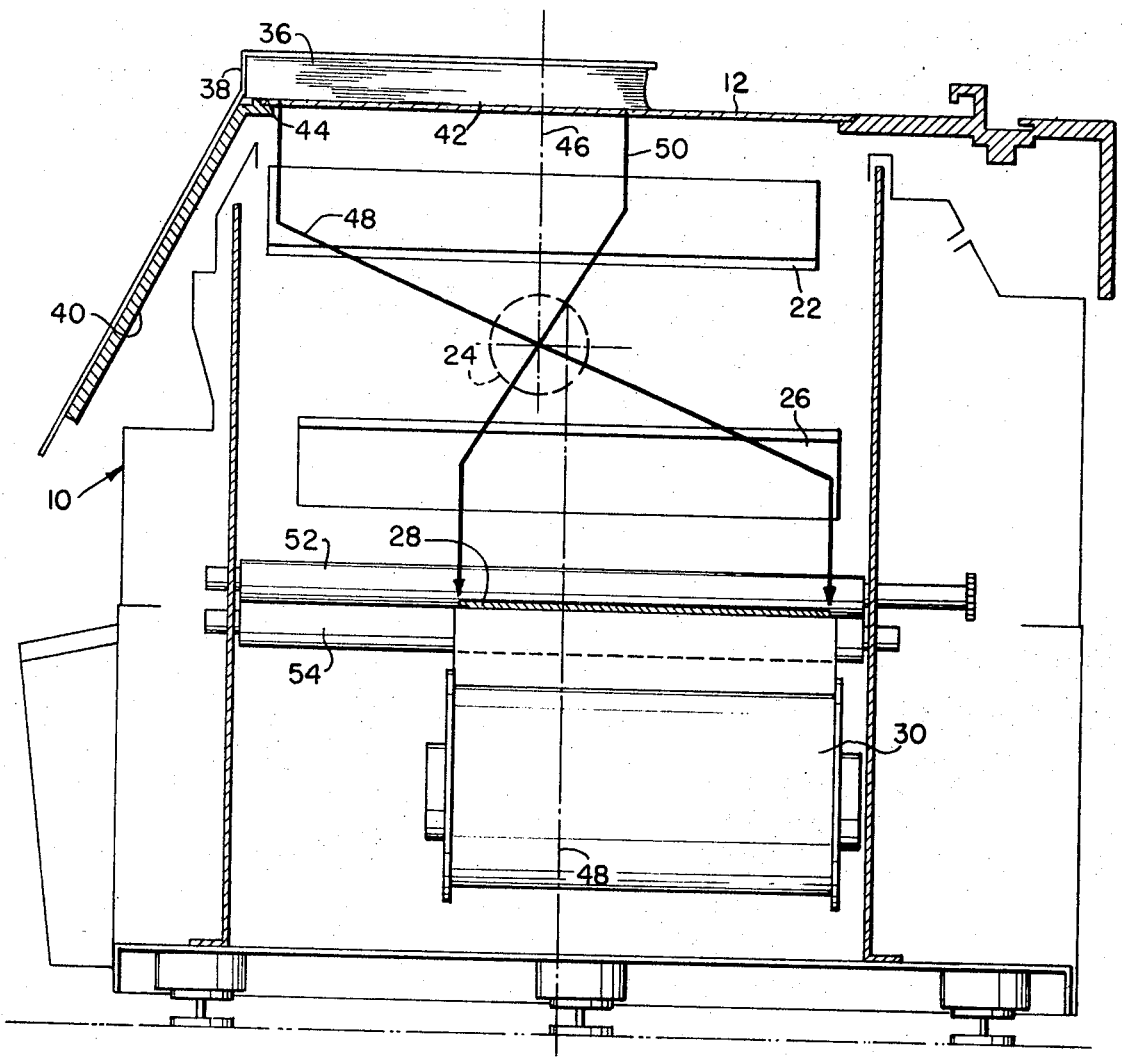
FIG. 3 is a cross sectional view taken along Line 3—3 of FIG. 1, looking in the direction of the arrows.

Referring now to FIG. 3, the horizontal alignment of the mirrors 22, 26 and the lens system 24 with regard to the central axis 48 of the copy machine 10 is set forth. All previous book copier designers have found it necessary to place books 36 flat on the machine scanning table 12 in order to center the image sheet in relation to the copy. This has resulted in a tendency to break the bindings 38 because of the desirability of placing the image carrying page directly against the scanning table surface to keep the entire image surface 20 in correct focus. As illustrated, the present machine provides an angularly disposed traversing table 40 depending from the side of the scanning table 12 to receive the book 36 with the binding 38 thereof placed at the angular junction between the traversing table 40 and the scanning table 12. Thus, with no interference from the binding 38, the book image page 42 to be copied readily lies flat upon the scanning table 12 without any damage whatsoever to the binding.

In order to copy to the inside margin 44 of the book 36, advantage is taken of crossing the image point in the optical system to place the copy paper off center. This permits working close to the margin 44 of the book without any damage whatsoever to the book binding 38. It should be noted that the center line 46 of the lens system 24 transversely offsets from the central axis 48 of the copy machine 10 in order to achieve the desired results in the least possible machine space requirement.

As illustrated in FIG. 1 and 3, the lines 48, 50 schematically illustrate the light path through the machine 10 from the image bearing surface 20 or 42 to the upper mirror 22, through the lens system 24, thence to the lower mirror 26 whereat the image carrying light rays are directed upon the previously electrostatically charged surface of the copy sheet 28. When in roll form, copy paper from the paper roll 30 feeds interiorly through the upper and lower transport rollers 52, 54 until the copy sheet 28 aligns under the image sheet 14 for photocopying purposes.

Figure 4:
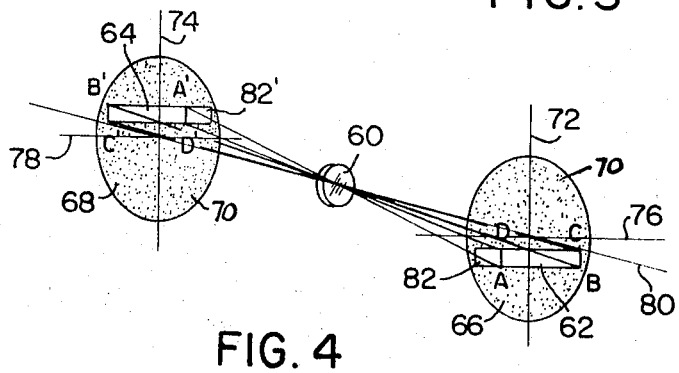
FIG. 4 is a schematic, perspective view of a non-aligned image optical system.

Referring now to FIG. 4, I show a non-aligned image optical system without mirrors employing a lens system 60 positioned intermediate the scanned image area 64 62 defined between the corners A,B,C,D and the copy area 64 which is defined between the corners A,B,C,D. In a scanning type copy machine of the type herein set forth, only a slit aperture is used corresponding to the scanned image area 62. In order to facilitate the production of a sharp copy, the balance of the object and image areas 66, 68 are essentially masked out as indicated by the stippled mask representation 70.

In the use of a lens, the object plane area and the image area are equal in dimensions on a one to one size ratio of projection as utilized in the present devices. Other ratios can be employed by utilizing other lens systems. As indicated, the plane areas 66, 68 of object and image focus are circular in configuration unless otherwise masked out. By employing the masks 70, rectangularly formed scanned image and copy areas 62, 64 can be developed.

In prior art copiers using a reflective lens system, the image and object are always centrally located in a horizontal plane on the optical axis with the offsetting of the object and image in a vertical plane.

In the present system, the image and object are shifted in a horizontal plane in addition to the vertical plane. This permits taking advantage of the full coverage of the lens and to register both the object and the image from a fixed location. As illustrated in FIG. 4, the lines B,C and B',C' are the register locations and are fixed. The edge of the original sheet 14 and the copy 28 will always locate from these points. The vertical center line 72 of the object plane 66 horizontally offsets from the vertical center line 74 of the image plane 68. Also, the horizontal center line 76 of the object plane 66 vertically offsets from the horizontal center line 78 of the image plane 68. The lines a,d and a', d' represent any variable width as dictated by the width of the object sheet 14, the variable area 82, 82' always falling within the object and image planes 66, 68. By fixing the register location B,C along the binding edge of a book, satisfactory book copying can always be assured for books of all widths.

It should be noted that by utilizing only a portion of the object and image planes 66, 68 for scanning purposes, both the image area 62 and the copy area 64 may be offset from the optical axis 80.

I claim:

1. In an electrostatic copy machine having a longitudinal axis of the type employing an upper, transparent scanning table having one reference side whereon an image bearing original sheet is positioned relative to the reference side to reflect an illuminated image of the original upon a copy sheet within the machine from a light source, the combination of
   A. an object plane area traversing beneath the original sheet within the copy machine,
      1. said object plane area being partially masked to define a scanned image area,
      2. said scanned image area including a first register location in vertical alignment with the scanning table reference side;
   B. an image plane area associated with the copy sheet and receiving the illuminated image of the original,
      1. said image plane being partially masked to define a copy area,
      2. said copy area including a second register location in optical alignment with the first register location,
      3. the said copy area being transversely offset within the copy machine from the said scanned image area;
   C. a lens system fixedly positioned within the copy machine intermediate the object plane and the image plane, said lens system focusing the illuminated image of the original upon the image plane,
      1. said lens system having an optical axis, said optical axis transversely being offset from the said copy machine longitudinal axis, whereby an exact copy of the image bearing original sheet is impressed upon the said copy sheet.

2. The invention of claim 1 wherein the scanned image area and the copy area are rectangular in configuration.

3. The invention of claim 2 wherein the scanned image area and the copy area include variable areas to compensate for varying widths of original sheets, the said variable area varying transversely outwardly from the respective first and second register locations.

4. The invention of claim 1 wherein the original sheet is a page of a bound book and wherein the book binding aligns over the scanning table reference side.

* * * * *